R. H. DUBOURG.
WHEELED HAND CULTIVATOR.
APPLICATION FILED AUG. 16, 1909.
971,121.
Patented Sept. 27, 1910.
2 SHEETS—SHEET 1.
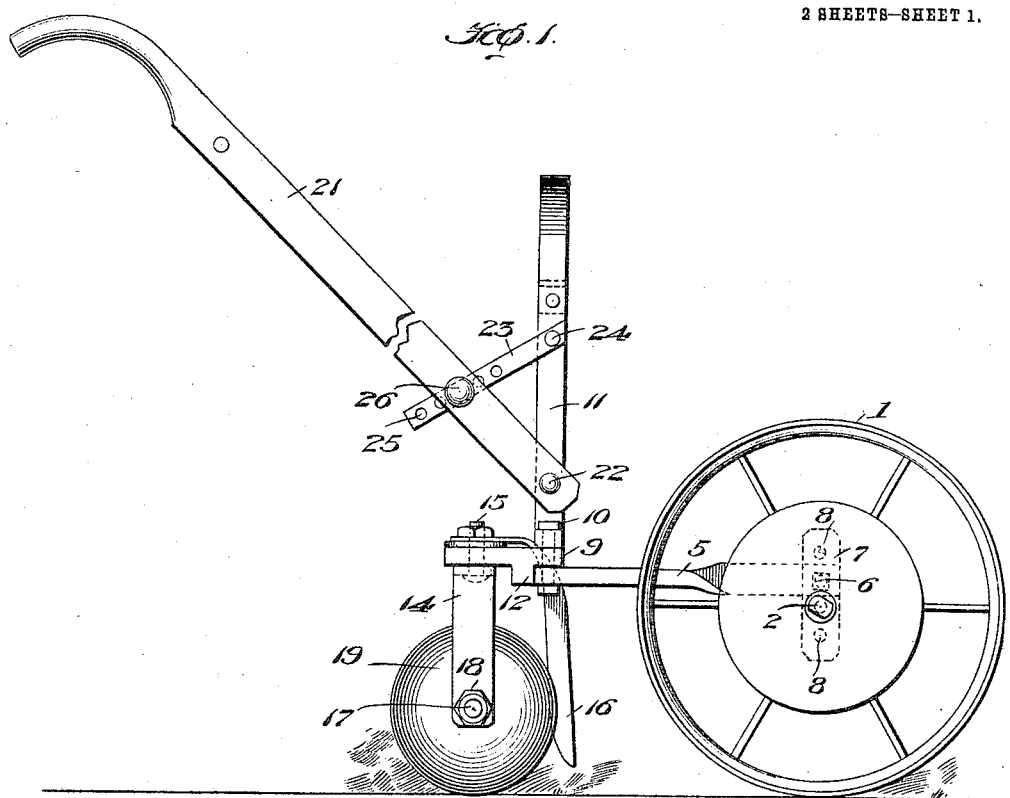
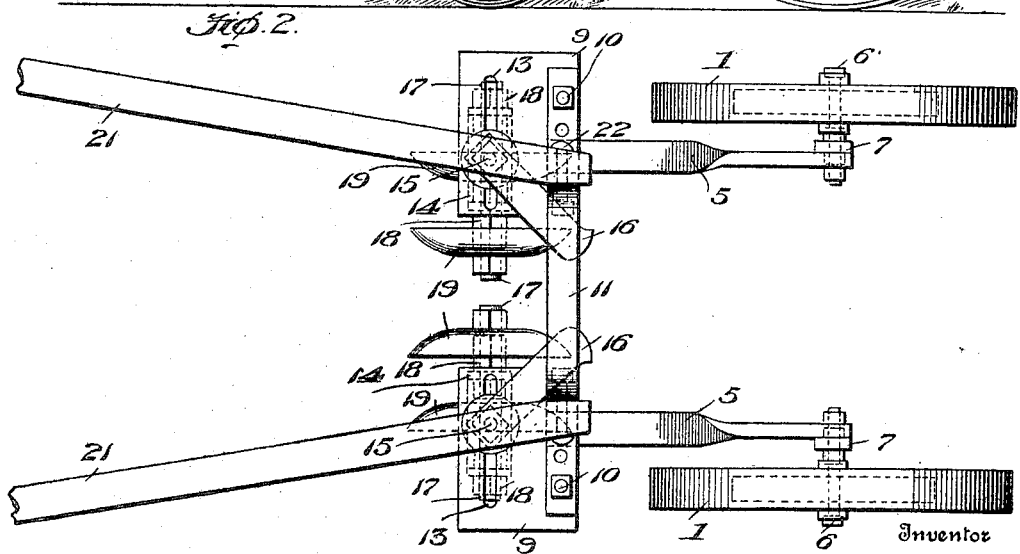
Witnesses
Inventor
Robert H. Dubourg
By Geo. A. Hamlin
Attorney R. H. DUBOURG.
WHEELED HAND CULTIVATOR.
APPLICATION FILED AUG. 16, 1909.
971,121.
Patented Sept. 27, 1910.
2 SHEETS—SHEET 2.
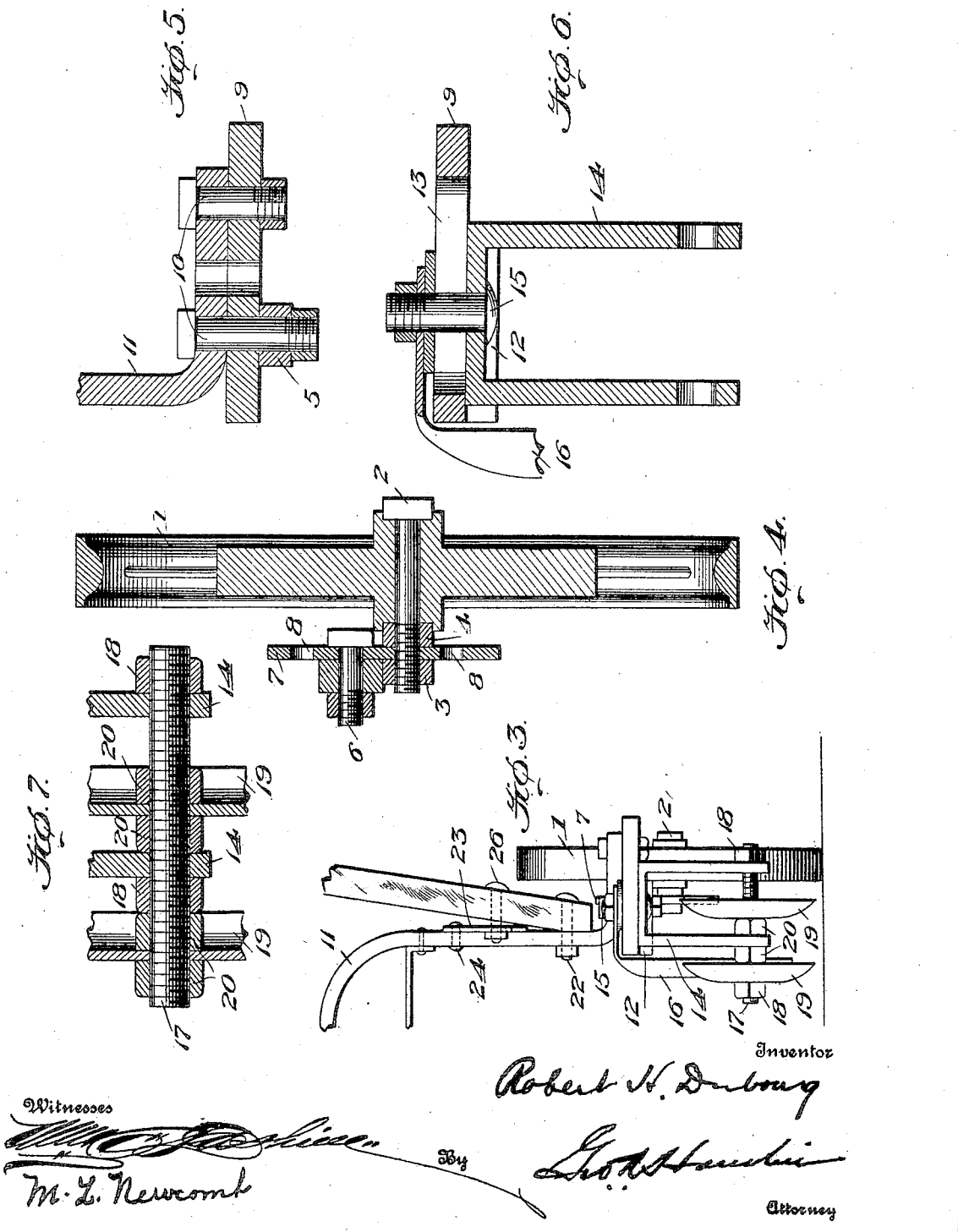

UNITED STATES PATENT OFFICE.

ROBERT H. DUBOURG, OF SHIVELY, KENTUCKY.

WHEELED HAND-CULTIVATOR.

971,121. Specification of Letters Patent. Patented Sept. 27, 1910.

Application filed August 16, 1909. Serial No. 513,182.

*To all whom it may concern:*

Be it known that I, ROBERT H. DUBOURG, a citizen of the United States, residing at Shively, county of Jefferson, and State of Kentucky, have invented certain new and useful Improvements in Wheeled Hand-Cultivators, of which the following is a specification.

My invention relates to wheeled hand cultivators.

The present invention has for its object the provision of a wheeled hand cultivator for cultivating the soil around onions, beets, parsnips, and the like, wherein the handles will be arranged and constructed in a novel fashion so that they may be readily adjusted to different heights to suit any one; to provide a novel adjustable connection between the wheels and frame whereby the cultivating devices may be positioned at different desired heights; wherein gangs of rotary disk cultivators will be employed which will be mounted in a novel manner on the frame so that the gangs may be rapidly and easily relatively adjusted and in which the disks of each gang may be adjusted in relation to each other, and wherein fenders having a novel connection with the frame, will be employed, all combined to provide a wheeled hand cultivator of simple, strong, durable, and inexpensive construction by which hand cultivation may be carried on in any desirable manner with rapidity and ease.

The invention is set forth fully hereinafter and its novel features are recited in the appended claim.

In the accompanying drawings: Figure 1 is a side elevation; Fig. 2, a plan view; Fig. 3, a rear elevation of one side of the machine; Fig. 4, a section of the wheel and its mountings; Fig. 5, a detail section showing the connections between the frame pieces and the arch; Fig. 6, a detail section of the adjustable mountings for the cultivator disk frames; and Fig. 7, a detail section showing the manner of journaling the cultivator disks.

The wheels 1 are provided with axles 2 on which they turn between the head and shoulder of the axle, the inner ends of the axles being screw-threaded and provided with nuts 3 and 4.

Secured to the frame side pieces 5 by bolts 6 are vertically disposed plates 7 which have a plurality of apertures 8 through any of which the screw-threaded end of the bolts 2 may be passed and secured by the nuts 3 and 4 on opposite sides thereof, thus holding the axles 2 rigid for the wheels 1 to loosely turn thereon. This adjustable construction permits of disposing the frame higher or lower in relation to the wheels so that the cultivator disks will enter more or less, as may be desired, into the soil.

To the rear ends of the side pieces 5 there are secured plates 9 by bolts 10 which also pass through the feet of an arch 11 which connects one plate 9 with the other and rigidly braces the side pieces 5 and the entire frame of the machine. The plates 9 are provided with depending parts 12 to afford a firm abutment for the ends of the side pieces 5, adding rigidity to the frame and preventing spreading of the side pieces aforesaid where connected to the wheels. The plates 9 are provided with transversely arranged elongated slots 13. The disk cultivator frames 14, which are of inverted U-shape, are secured against the bottoms of the plates 9 by bolts 15, only one bolt being employed for each frame, whereby the said frames may be turned at any desired angle to dispose the cultivating disks as may be found necessary. The bolts 15 also secure fenders 16 which may also be turned to any desired position according to the requirements of use. These fenders may be adjusted as desired, being adapted to raise fallen or leaning stalks and prevent them from being cut or covered by the cultivating disks.

Extending through apertures in the lower ends of the frames 14 are screw-threaded shafts 17 which may be clamped to the said frames, after any desired lateral adjustment, by nuts 18. Loosely mounted on the shafts 17 are rotary cultivating disks 19 which may be adjusted to any desired points of rotation lengthwise of the shaft 17 by nuts 20 coöperating with the nuts 18. Thus, the cultivator disks of each set may be spaced apart as desired and by reason of the adjustment of the frames 14, the gangs or sets may be adjusted toward or away from each other and arranged at any desired angles.

The handles 21 are pivoted to the arch 11 by the bolts 22 and may be raised or lowered to any desired height according to the reach of the user so that the machine may be as well adapted for use by a small boy as by a tall man. To hold the handles at the desired angles to which they have been adjusted there are provided links 23 pivoted at 24 to the sides of the arch 11 and provided with a series of openings 25 through any of which the bolts 26 may be passed.

Having thus described my invention, what I claim as new and desire to secure by Letters Patent, is:—

In a wheeled hand cultivator, the combination with a frame, and wheels therefor, of cultivator disk frames, cultivator disks carried by said frames, bolts adjustably connecting the frames to the main frame whereby the cultivator disk frames may be adjusted angularly, and fenders adjustably fastened in position by said bolts.

In testimony whereof, I hereunto affix my signature in presence of two witnesses.

ROBERT H. DUBOURG.

Witnesses:
J. P. SHIVELY,
W. T. HALE.